C. LEAVITT.
Wheel-Hub.
No. 34,149.
Patented Jan. 14, 1862.
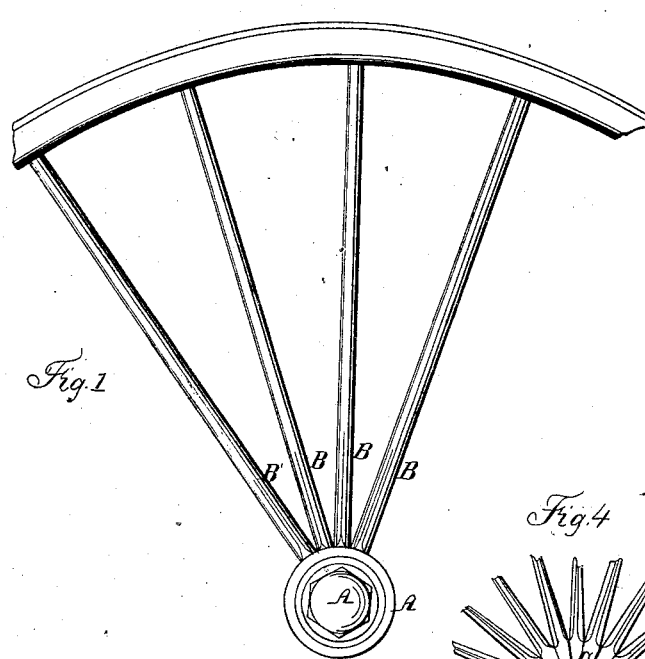
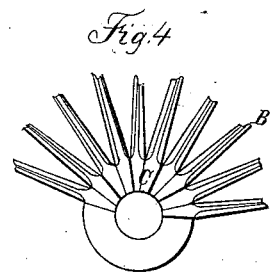
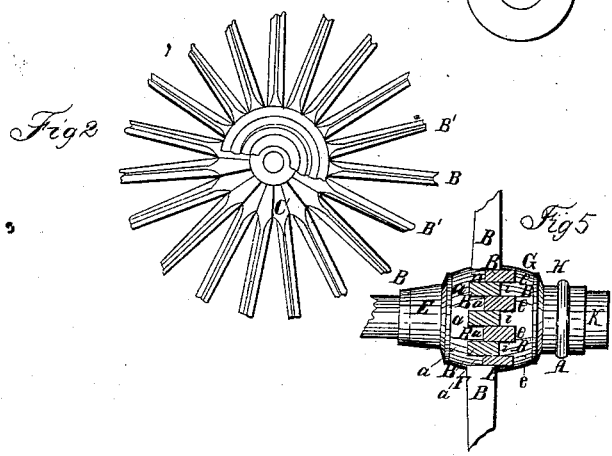
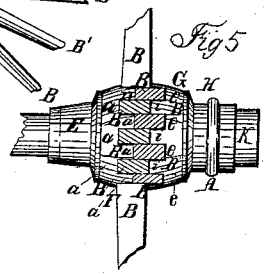
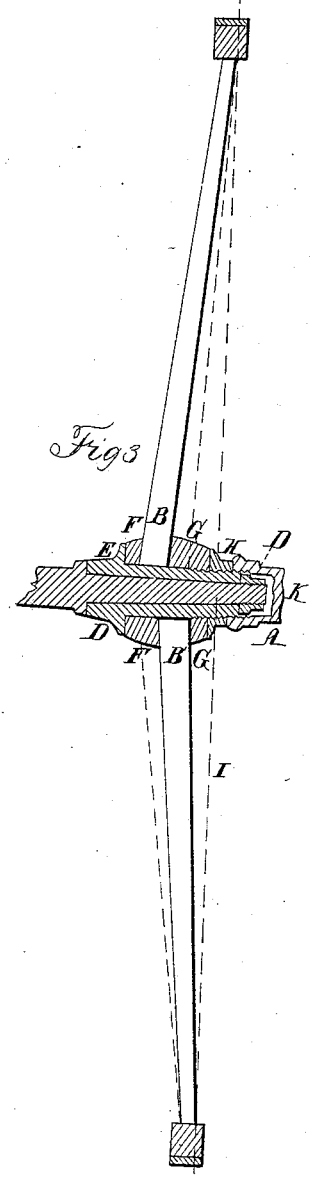
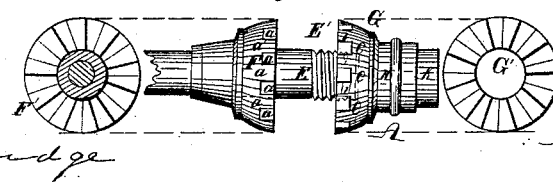
Witnesses:
J. Bramin
W. H. Burridge
Inventor:
Charles Leavitt

UNITED STATES PATENT OFFICE.

CHARLES LEAVITT, OF CLEVELAND, OHIO.

IMPROVEMENT IN CARRIAGE-WHEELS.

Specification forming part of Letters Patent No. 34,149, dated January 14, 1862.

*To all whom it may concern:*

Be it known that I, CHARLES LEAVITT, of Cleveland, in the county of Cuyahoga and State of Ohio, have invented new and useful Improvements in Carriage-Wheels; and I do hereby declare that the following is a full and complete description of the construction and operation of the same, reference being had to the accompanying drawings, making part of this specification, in which—

Figure 1 is a front view of a section of the wheel. Fig. 2 is a back sectional view. Fig. 3 is a vertical section of the whole wheel. Fig. 4 is a transverse section of the hub with part of the spokes shown. Fig. 5 is a longitudinal view of the hub with two spokes inserted, and Fig. 6 is the hub with the parts holding the spokes detached.

Like letters refer to like parts in the several views.

The nature of my invention relates to such a construction of the hub that the spokes of the wheel can be arranged in two rows, thus forming a broader base, the spokes being in contact with each other for part of their width, thus filling the entire circle, while at the same time each separate spoke is supported in part or in whole upon each side by a metallic mortise. The hub being formed in two parts and made of metal, enables me by means of a screw upon the pipe-box to compress the spokes edgewise, and thus preserve their position in the wheel. At the same time the desired amount of dish is given to the wheel by means of the back part of the hub being concave and the front part convex where the two parts impinge against the edge of the spokes. By this arrangement the largest possible number of spokes can be introduced, the required amount of dish obtained, and each spoke be supported by a metallic bearing upon either side and at the inner end upon the pipe-box. Any shrinkage in the spokes causing looseness can be remedied at any time by screwing up the nut that holds the parts together. The wheel is also so constructed that each spoke has a bearing upon the pipe-box.

A, Fig. 1, represents the front end of the hub. The front end of the hub is also represented by the same letter in Figs. 3, 5, and 6.

B B' in the several figures represent the spokes. These may be made by machinery in the common manner, and are straight upon their back and front edges. Their sides may also be straight from the point at which they leave the hub till they enter the felly. The ends that enter the hub are flattened, as seen at C in Fig. 2 and 4, upon their sides, so that these flattened sides represent radial lines from the center of the axle.

In Fig. 3, which is a vertical section of the wheel and hub, the structure of the hub is clearly shown. In this figure D represents the axle. This is made in the usual form, with a nut D' upon the outer end.

E is a pipe-box. (Indicated also by the same letter in Figs. 5 and 6.) The outer end of this has a heavy thread cut upon it, as indicated at E'.

F is the heel or back part of the hub, and may be cast with the pipe-box or separate from it. The face of this is seen at F' in Fig. 6, and is divided into equal radial parts, in number equaling half the number of spokes in the wheel. Every alternate division is cut away to a depth equaling half the width of the spoke, as seen at $a\ a\ a$ in Figs. 5 and 6, more or less, in each of which half-mortise is affixed a spoke B, the inner end of which is fitted to and rests upon the pipe-box E.

The front end of the hub G, so far as these half-mortises are concerned, is an exact duplicate of the part represented by F, and is always cast separate from the pipe-box E. The opening G' is sufficiently large to admit of its passage over the pipe-box, where it is held in place by the nut H on the thread E'. The part F of the hub being filled with spokes, as before described, a like number of recesses or half-mortises is formed between the spokes, corresponding to the half-mortises in the forward end of the hub G, and seen at $a'$, which, being also filled with spokes B', is passed upon the pipe-box E, the spokes B' entering between the spokes B, as in Fig. 5. The metallic projections $e\ i\ e\ i\ e\ i$ mutually press against the spokes B B' by means of the nut H being screwed upon the pipe-box E, as before described.

By means of the concave surface of the face of F and the convex surface of the face of G the desired dish is given to the wheel, as indicated by the red line I in Fig. 3.

A cap K is screwed upon the outer end of the pipe-box, which forms a handsome finish to the hub and protects the outer end of the axle from mud and dust.

In fitting this wheel together the spokes may be set in both parts F and G and temporarily clamped together, and the inner ends of the spokes bored out to a uniform length, so as to fit accurately upon the pipe-box E. Should a spoke become broken by accident, a new one can be replaced by running off the nut H and removing the forward end of the hub G, and this without disturbing the position of any other spokes, and, further, the spokes can be kept permanently tight by tightening at any time the nut H.

I am aware that carriage-wheels have been constructed by securing the spokes between two flat plates or disks constituting a portion of the hub. I therefore do not claim this *per se;* but,

What I claim as my improvement, and desire to secure by Letters Patent, is—

So dividing the two parts of the hub F and G into alternate depressions and projections having their longitudinal faces bounded by radial lines from the center of the axle and filling the alternate spaces $a'$ and $e$ with spokes in such a manner that each spoke shall have in part a metallic bearing upon each side, filling the entire space with spokes, as described, in combination with the concave face of F and the convex face of G, the nut H, and cap K, operating as and for the purpose set forth.

CHARLES LEAVITT.

Witnesses:
J. BRAINERD,
W. H. BURRIDGE.